United States Patent [19]

Schroeter

[11] Patent Number: 5,103,939
[45] Date of Patent: Apr. 14, 1992

[54] SPOT TYPE DISC BRAKE

[75] Inventor: Christian Schroeter, Sinzig, Fed. Rep. of Germany

[73] Assignee: Lucas Industries public limited company, Birmingham, England

[21] Appl. No.: 555,641

[22] Filed: Jul. 23, 1990

[30] Foreign Application Priority Data

Aug. 11, 1989 [DE] Fed. Rep. of Germany ....... 8909654

[51] Int. Cl.$^5$ ........................................... F16D 55/227
[52] U.S. Cl. .................... 188/72.4; 188/72.5; 188/73.32; 188/73.39; 188/73.45; 188/73.47
[58] Field of Search .............. 188/73.45, 73.44, 73.39, 188/73.47, 73.32, 72.4, 72.5

[56] References Cited

U.S. PATENT DOCUMENTS

| 3,416,634 | 12/1968 | Swift | 188/73.39 X |
| 3,602,328 | 8/1971 | Fannin et al. | 188/73.47 X |
| 4,392,560 | 7/1983 | Nakasu et al. | 188/73.45 X |

FOREIGN PATENT DOCUMENTS

| 2039951 | 2/1972 | Fed. Rep. of Germany | 188/72.5 |
| 2742105 | 3/1979 | Fed. Rep. of Germany | . |
| 1492674 | 8/1967 | France | 188/73.45 |

Primary Examiner—George E. A. Halvosa
Attorney, Agent, or Firm—Oblon, Spivak, McClelland, Maier & Neustadt

[57] ABSTRACT

The brake has a carrier member (12) comprising a fastening portion (14) for mounting near a brake disc (10) and a centrally disposed bridging portion (16) extending across the brake disc (10), as well as a floating caliper (30) which straddles part of the brake disc (10) and the carrier member (12) as well as the brake pads (40,42). A pair of actuating cylinders (36) are disposed at least approximately symmetrically with respect to an axial center plane (D) of the carrier member (12), at the floating caliper (30). At each side of the brake disc (10) there are two separate brake pads (40, 42) adapted to be disassembled past the bridging portion (16) substantially radially with respect to the brake disc (10) when the brake is in its installed position. The floating caliper (30) is guided at the fastening portion (14) on two pins (26,28) located in the center plane (D) of the carrier member (12) and, in addition, directly at a guide member (34) formed at the bridging portion (16) beyond the brake disc (10), as seen from the fastening portion (14).

6 Claims, 4 Drawing Sheets

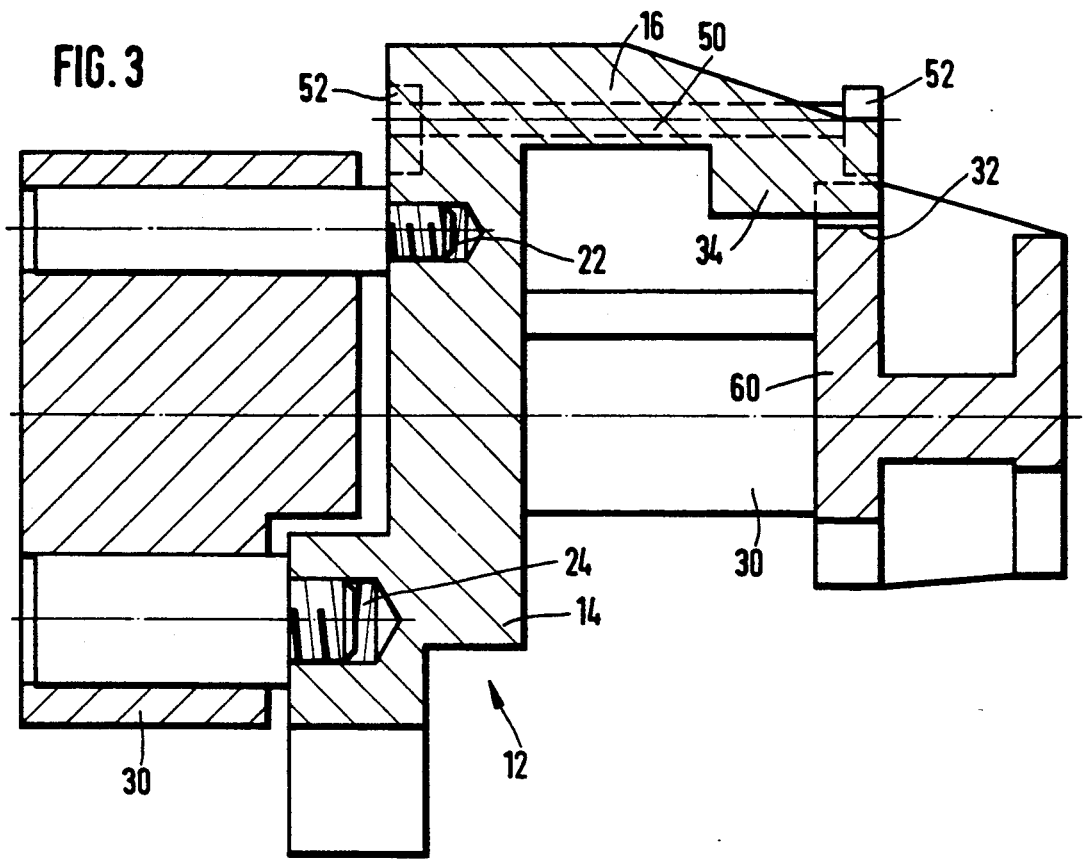
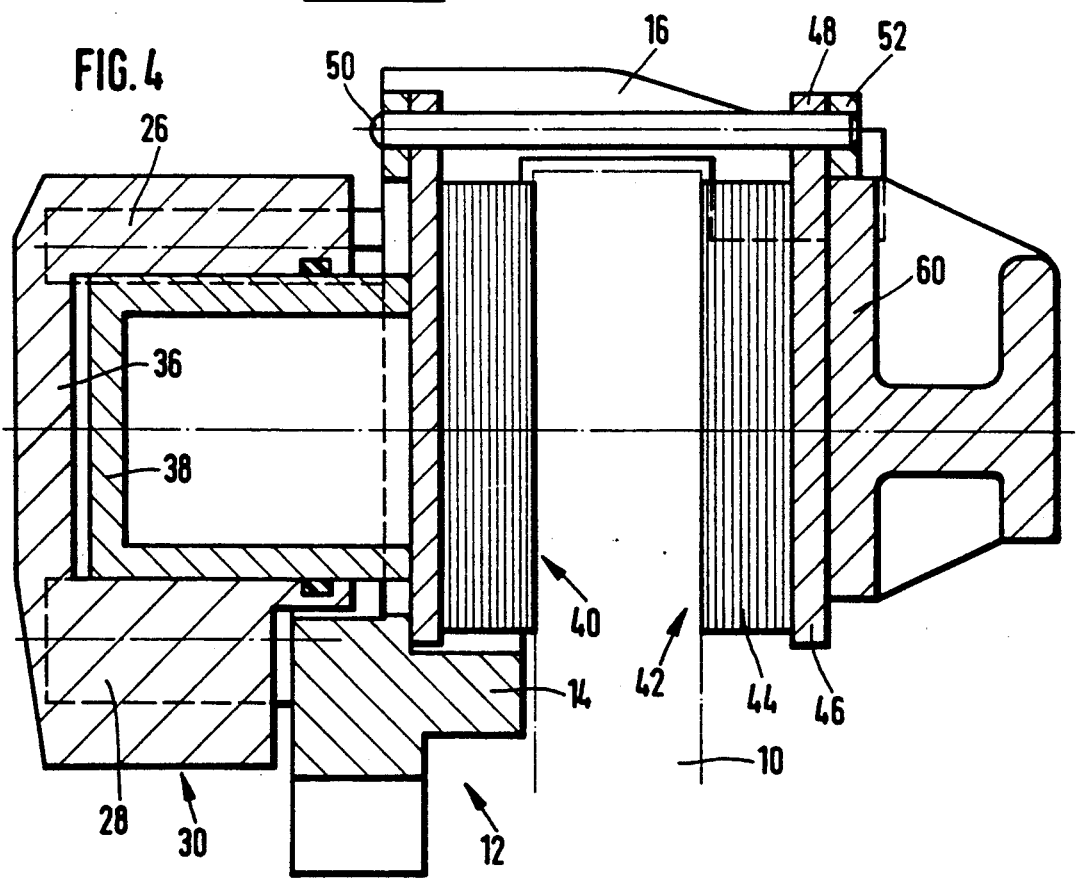

SPOT TYPE DISC BRAKE

FIELD OF THE INVENTION

The instant invention relates to a spot type disc brake comprising a brake carrier member which includes a fastening portion for mounting close to a brake disc and a centrally disposed bridging portion extending across the brake disc, brake pads arranged at either side of the brake disc and supported at the carrier member against brake pressure, a floating caliper which straddles part of the brake disc and the carrier member as well as the brake pads and is guided at the carrier member, and at least one pair of actuating cylinders arranged at the floating caliper approximately symmetrically with respect to an axial center plane of the carrier member.

BACKGROUND OF THE INVENTION

In a known brake of this kind (DE 27 42 105 A1) one brake pad each is arranged at either side of the brake disc. Each brake pad is elongated in circumferential direction of the brake disc and has a recess in the middle of its radially outer edge to be engaged by the centrally located bridging portion of the carrier member. In this manner both brake pads are guided for axial displacement at the bridging portion. The two actuating cylinders provided at the floating caliper both act on the same brake pad. Between the two actuating cylinders a pin which extends parallel to the axis of the brake disc and slidingly engages in a bore formed in the carrier member is fastened at the floating caliper. In this manner the floating caliper is guided for axial displacement at the brake carrier member.

When it becomes necessary to replace the brake pads of this known brake, the entire brake must be dismantled and the floating caliper be separated from the carrier member because only then can the brake pads be shifted axially so far as to be releasable from the bridging portion of the carrier member. The bridging portion consequently is disadvantageous in this respect. On the other hand, the central guidance of the two brake pads at the bridging portion is favorable for the floating caliper at which one of the brake pads is secured, namely the one remote from the actuating cylinders, because hereby the floating caliper is indirectly guided by means of this brake pad at the axially outer end of the bridging portion.

Apart from the fact that the provision of two actuating cylinders at the floating caliper of the known brake permits the floating caliper to be guided centrally at the fastening portion of the carrier member, it also has the advantage that the two actuating cylinders transmit the clamping force they generate more evenly to the adjacent brake pad than could be accomplished by a single centrally disposed cylinder. The friction lining of said brake pad, therefore, is worn substantially uniformly even though it is rather long in circumferential direction of the brake disc.

Moderate actuation of the known brake at high speed may, however, give rise to rubbing noise which may be transmitted to the entire vehicle equipped with such brakes and which then is sensed as very unpleasant.

SUMMARY OF THE INVENTION

It is an object of the invention to avoid such disturbing rubbing noise.

The invention is based on the finding that the elongated brake pad configuration is apt to create severe local overheating of the brake disc when the known brake is applied at high speed. Such local overheating may result in differential thickness of the brake disc, in a manner known per se, and may even lead to a change in structure—formation of martensite—upon sudden cooling. These alterations in thickness and/or structure of the brake disc cause great periodic variations of the brake torque when the brake disc is rotating, and hereby the brake carrier member which accommodates the brake torque excites the vehicle to vibrate. The local transformation of the structure likewise may cause cracks between the original structure and those parts which were changed.

Starting from that realization, the object mentioned above is met, in accordance with the invention, in a disc brake of the kind specified initially in that two separate brake pads are arranged at either side of the brake disc and adapted to be disassembled, past the bridging portion, substantially radially with respect to the brake disc when the brake is in its condition of use, that the floating caliper is guided at the fastening portion on two pins provided in the center plane of the carrier member, and that the floating caliper, in addition, is guided on a guide member formed on the bridging portion beyond the brake disc, as viewed from the fastening portion.

The division of the previous single brake pad mounted at either side of the brake disc into two separate brake pads which are independent of each other and can be disassembled substantially radially past the bridging portion, provides an intervening space between the two brake pads at the two sides of the brake disc. The width of this intervening space, measured in circumferential direction of the brake disc, is at least as great as the width of the bridging portion. This intervening space is sufficient to have some cooling take place on the braking surfaces which have been subjected to the action of a respective one of the brake pads during each individual rotation of the brake disc before the other brake pad acts on the same surface area at the same side of the brake disc. The cooling counteracts any structural change in the brake disc. As a consequence, the excitation of vibrations in the brake pads is less intensive. The circumstance of smaller differences in thickness due to thermal expansion of the brake disc occurring at smaller differences in temperature in the brake disc acts in the same sense. Moreover, the division of the brake pads into a pair each of brake pads at both sides of the brake disc permits the individual brake pads which are short in circumferential direction to adapt better to the differential thickness of the brake disc than any long brake pads which predominantly contact only locations of greater thickness, causing constant overheating by energy transformation at these places alone. The adaptation of the brake pads to the brake disc enabled by the invention is improved still further in that the floating caliper always remains easily movable in an axial direction in its guide members. As a matter of fact, the invention locates the guide members in zones of the carrier member which are weakly deformed, whereby mutual jamming of the pins is avoided. Additionally, the brake pads at each side of the brake disc are mechanically uncoupled from each other so that any vibrations of the leading brake pad are not transmitted to the trailing brake pad.

As an overall result of the measures according to the invention the operation of the brake is largely and perhaps even fully free of rubbing noise, even upon moderately strong application of the brakes which particularly caused problems before.

Conveniently the intervening space left between the friction linings of two brake pads each, disposed at the same side of the brake disc, is of a width in circumferential direction of the brake disc corresponding to at least half the width of each individual friction lining measured in circumferential direction.

In the case of preferred embodiments of the invention the width of the intervening space corresponds to from 70 to 100% of the width of the friction lining.

BRIEF DESCRIPTION OF THE DRAWINGS

The invention will be described further, by way of example, with reference to the accompanying drawings, in which:

FIG. 3 is an axial section along lines III—III in FIG. 1, with the omission of some structural members;

FIG. 4 is a sectional view along lines IV—IV in FIG. 1;

FIG. 5 is a cutout of FIG. 1, with the omission of some structural members; and

DESCRIPTION OF THE PREFERRED EMBODIMENTS

Figure 1:
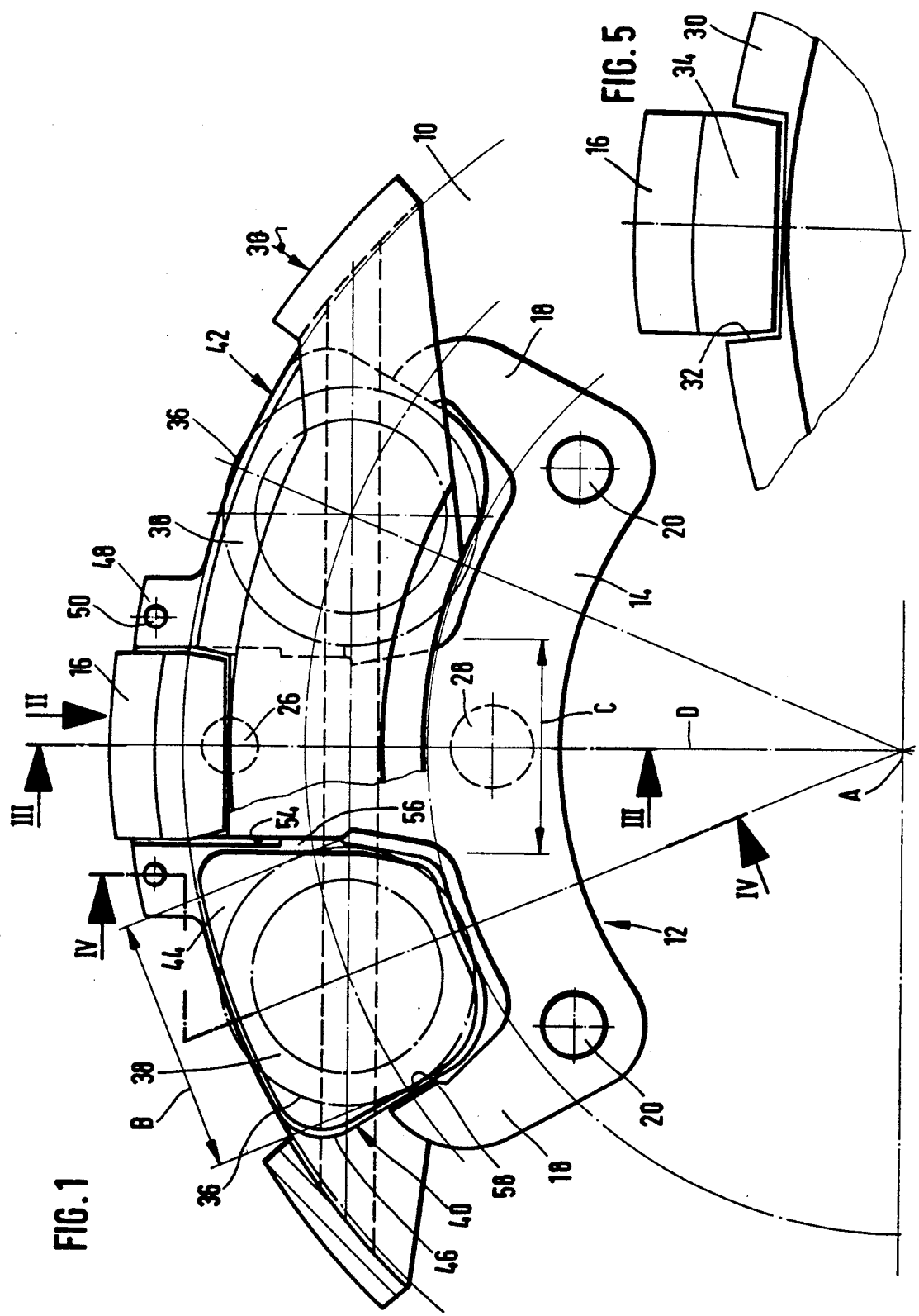
FIG. 1 is a side elevational view of a brake according to the invention, in the direction of arrow I in FIG. 2.
Figure 2:
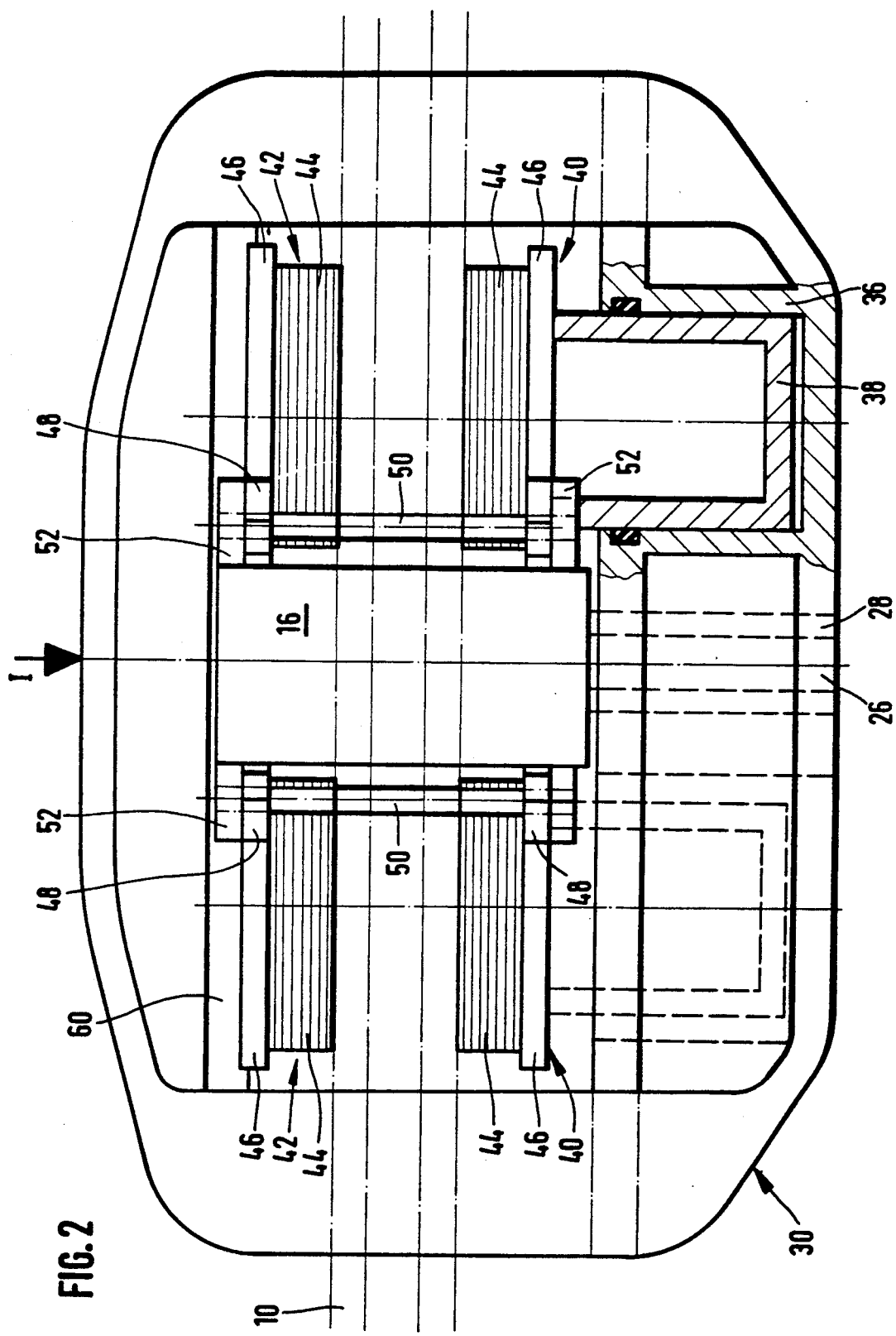
FIG. 2 is a top plan view of the brake in the direction of arrow II in FIG. 1.

The brake illustrated in FIGS. 1 to 5 is associated with a brake disc 10 which is indicated in dash-dot lines and is of double-walled design, as shown in FIG. 2. The brake comprises a carrier member 12 including a fastening portion 14 disposed in a plane in parallel with the brake disc 10 and a bridging portion 16 extending at right angles with respect to this plane and across the outer edge of the brake disc 10.

The fastening portion 14 has two arms 18 extending radially outwardly from a respective aperture 20 without, however, reaching the rim of the brake disc 10. The apertures 20 serve for fastening of the carrier member 12 to an axle casing or the like. The fastening portion 14 further includes two threaded bores 22 and 24 located radially above each other in the middle between the two arms 18 and each receiving a threaded end portion of an otherwise smooth cylindrical pin 26 and 28, respectively.

The two pins 26 and 28 extend parallel to axis A of the brake disc 10 and guide a floating caliper 30 whose load is supported mainly by the lower pin 28 in FIG. 1. This pin is positioned closer to the axis A and has a greater diameter and a shorter length than the radially outer pin 26. The radially outer pin 26 essentially functions to prevent pivoting of the floating caliper 30 about the radially inner pin 28. The two pins 26 and 28, therefore, assure safe guidance of the floating caliper 30 at its inner side with respect to the corresponding vehicle.

Support of the floating caliper 30 against brake drag is also provided at its outer side by engagement of a trapezoid recess 32 formed at that location in the floating caliper 30 with a complementary trapezoid guide member 34 formed at the free end of the bridging portion 16 remote from the fastening portion 14.

Two hydraulic actuating cylinders 36 each guiding a plunger 38 are arranged on the inner side of the floating caliper 30. A brake pad 40 is associated with each respective one of the plungers 38 and adapted to be pressed directly against the brake disc 10 by the same. Another pair of brake pads 42 adapted to be actuated indirectly by displacement of the floating caliper 30 are located at the other side of the brake disc 10, being the outer side thereof with respect to the vehicle.

Each brake pad 40, 42 includes a friction lining 44 and a backplate 46. All the friction linings 44 are of the same shape and size, their shape essentially being that of an asymmetric trapazoid circumscribing a circle whose diameter approximately corresponds to the outer diameter of the corresponding cylinder 36, 38. As shown in FIG. 1, the mean width B of each friction lining 44, measured in circumferential direction of the brake disc 10, is somewhat greater than the outer diameter of the corresponding plunger 38.

An intervening space C is left free between the friction linings 44 of the respective pairs of brake pads 40 and 42 each disposed on the same side of the brake disc 10. The width C of that space in circumferential direction of the brake disc 10 is somewhat greater than the width of the bridging portion 16 and only a little smaller than the mean width B of the lining whereby the pads may be easily withdrawn past the bridging portion 16 substantially radially with respect to the brake disc 10 without interference by the bridging portion 16 and with no need to disassemble the entire brake. In the preferred embodiment illustrated the width C corresponds to approximately 80 to 85% of the mean width B of the friction lining.

The whole brake is designed symmetrically with respect to the center plane D which contains the axis A of the brake disc 10 and the axes of both pins 26 and 28.

The backplates 46 of all the brake pads 40 and 42 each have an apertured upper projection 48. Parallel to axis A, a retaining pin 50 passes through the projections 48 of each pair of opposed brake pads 40 and 42 each and is secured at corresponding apertured projections 52 of the bridging portion 16. The brake pads 40 and 42 thus are secured against falling out.

The two brake pads 40 which are acted on directly by a respective plunger 38 are supported by paraxial guide faces 54 provided at the fastening portion 14 and by shoulders 56 formed at the backplates 46 of these brake pads and coordinated with those guide faces as well as by guide faces 58 provided at the sides facing each other of the two arms 18 of the fastening portion 14. These two brake pads 40 consequently transmit all the brake pressures to which they are subjected directly to the fastening portion 14 of the brake carrier member 12.

The two brake pads 42 which are operable by shifting of the floating caliper 30 are held in firm lock engagement in a transverse yoke 60 of the floating caliper 30 and, therefore, transmit the brake pressures exerted upon them to the floating caliper 30, in both directions of rotation of the brake disc 10. Upon application of the brakes, the floating caliper can rest on the bridging portion 16.

Figure 6:
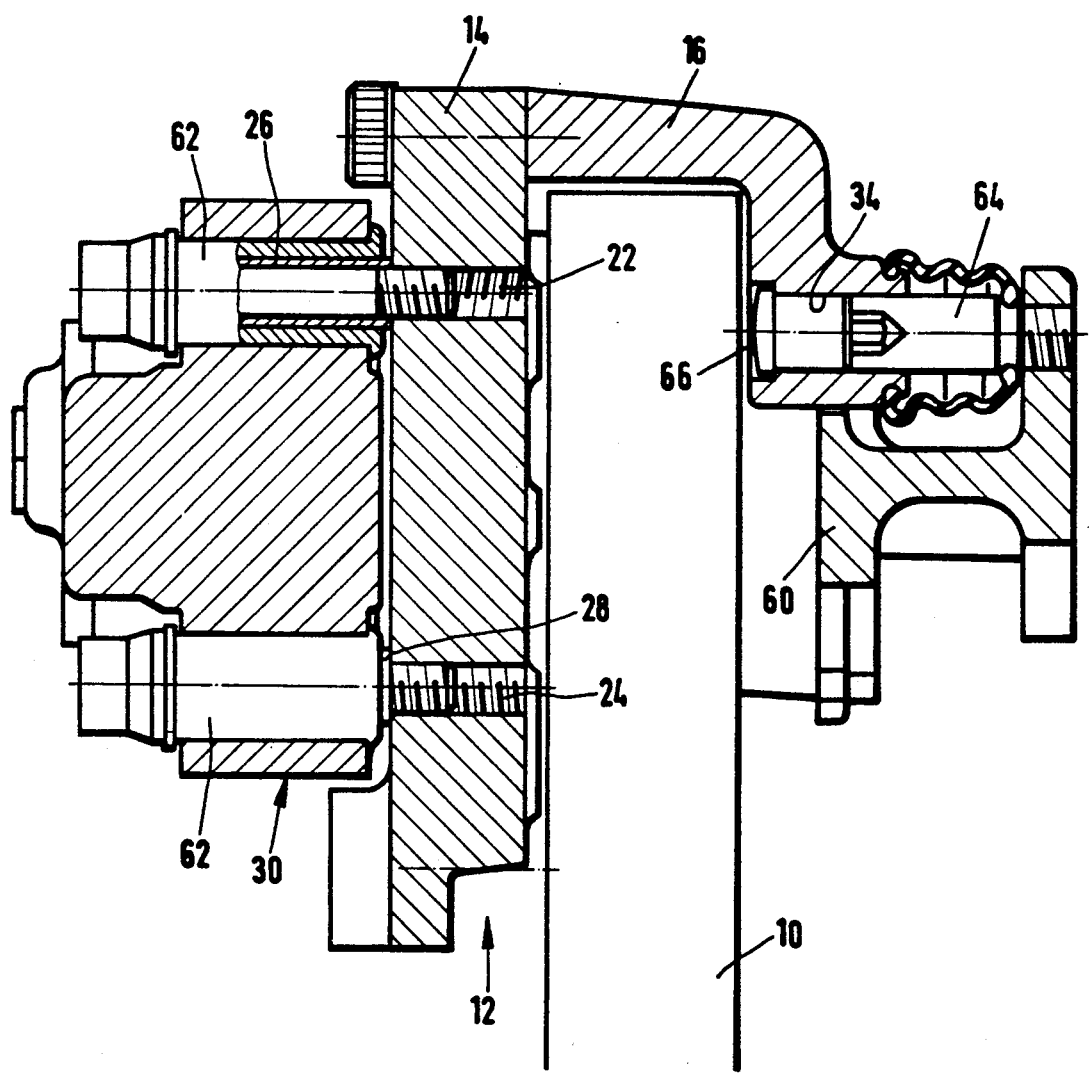
FIG. 6 is an axial section similar to FIG. 3 of a modified embodiment of the invention.

In the embodiment shown in FIG. 6, each pin 26 and 28 is guided in a respective bushing 62 secured in the floating caliper 30. The guide member 34 at the outer side of the bridging portion 16, is embodied by a bore which is parallel to the axis A and in which a pin 64 is guided that is fastened to the floating caliper 30. At its axially inner end, the guide member 34 is sealed by a pressed-in cap 66.

What is claimed is:

1. A spot type disc brake, comprising a brake carrier member (12) which includes a fastening portion (14) for mounting said member close to a brake disc (10) and bridging portion (16) extending from the center of said member across the brake disc (10), brake pad means (40,42) arranged at either side of the brake disc (10) and supported against braking drag by said carrier member (12), a floating frame type caliper (30) straddling part of said brake disc (10) and said brake pad means (40,42) and surrounding said carrier member (12) as well as said brake pad means (40,42) and being guided on said carrier member (12), and at least one pair of actuating cylinders (36) disposed in said floating caliper (30) in approximate symmetry with respect to the axial center plane (D) of the carrier member (12), said brake pad means comprising two pairs of separate brake pads (40,42) one pair each arranged at a respective side of said brake disc, (10), the two pads of each pair (40, 42) being spaced from each other by an intervening distance (C) not less than the width of said bridging portion (16) whereby each pad (40,42) may be substantially radially withdrawn with respect to said disc (10) without interference by said bridging portion (16) when said brake is in its position of use, said floating caliper (30) being guided on said fastening portion (14) on two pins (26,28) disposed in the center plane (D) of said carrier member (12), and also being guided at a guide member (34) formed on said bridging portion (16) and extending beyond said brake disc (10), as viewed from said fastening portion (14).

2. The spot type disc brake as claimed in claim 1, wherein said intervening space (C) is at least half the width (B) of each individual lining (44) when measured in circumferential direction.

3. The spot type disc brake as claimed in claim 2, wherein the width (C) of the intervening space corresponds to from 70 to 100% of the width (B) of the friction lining (44).

4. A spot type disc brake, comprising a brake carrier member (12) which includes a fastening portion (14) for mounting said member close to a brake disc (10) and bridging portion (16) extending from the center of said member across said brake disc (10), brake pad means (40,42) arranged at either side of the brake disc (10) and supported against braking drag by said carrier member (12), a floating frame type caliper (30) straddling part of said brake disc (10) and said brake pad means (40,42) and surrounding said carrier member (12) as well as said brake pad means (40,42) and being guided on said carrier member (12), and at least one pair of actuating cylinders (36) disposed in said floating caliper (30) on one side of said brake disc (10) in approximate symmetry with respect to the axial center plane (D) of said carrier member (12), said brake pad means including at least one pair of separate brake pads (40) arranged at the said side of said brake disc (10) as said actuating cylinders (36), said pads of said at least one pair (40) being spaced from each other by a distance (C) not less than the width of said bridging portion (16) whereby each pad (40) may be substantially radially withdrawn with respect to said disc (10) without interference by said bridging portion (16) when said brake is in its position of use, said floating caliper (30) being guided on said fastening portion (14) on at least two spaced guide means (26,28) carried by said carrier member (12), and also being guided at a guided member (34) formed on said bridging portion (16) and extending beyond said brake disc (10), as viewed from said fastening portion (14).

5. The spot type disc brake of claim 4 wherein said guide means comprise two pins (26,28) disposed in the center plane (D) of said carrier member (12).

6. The spot type disc brake of claim 4 wherein the brake pad means (42) disposed on the side of said disc (10) opposite said actuating cylinders (36) have releasable lock engagement with said floating caliper (30) whereby braking drag on said oppositely disposed brake pad means (42) is transferred to said carrier member (12) through said floating caliper (30) and said guide member (34) formed on said bridging portion (16).

* * * * *